United States Patent [19]

Wojcinski et al.

[11] Patent Number: 4,731,825

[45] Date of Patent: Mar. 15, 1988

[54] NONBLOCKING SWITCHING SYSTEM AND METHOD

[75] Inventors: Robert F. Wojcinski, Downers Grove; John A. Cicero, Lisle, both of Ill.

[73] Assignee: Tellabs, Inc., Lisle, Ill.

[21] Appl. No.: 822,389

[22] Filed: Jan. 27, 1986

[51] Int. Cl.$^4$ .............................................. H04Q 3/42
[52] U.S. Cl. ...................................... 379/273; 379/16
[58] Field of Search .................... 340/827; 370/16, 58; 379/2, 10, 15, 16, 273

[56] References Cited

U.S. PATENT DOCUMENTS

| | | | |
|---|---|---|---|
| 3,865,999 | 2/1975 | Spitaels | 379/10 X |
| 4,345,324 | 8/1982 | Smitt | 379/15 X |
| 4,455,645 | 6/1984 | Mijioka et al. | 379/279 X |
| 4,497,054 | 1/1985 | Read | 370/58 |

OTHER PUBLICATIONS

Benes, "Blocking States in Connecting Networks Made of Square Switches Arranged in Stages", *BSTJ*, vol. 60, No. 4 (Apr. '81), pp. 511–521.

*Primary Examiner*—Jin F. Ng
*Assistant Examiner*—Mark E. Ham

*Attorney, Agent, or Firm*—Juettner Pyle Lloyd & Verbeck

[57] ABSTRACT

A nonblocking switching system for communications systems is characterized by two identical blocking networks, each for being connected in series between sources and destinations to be selectively interconnected. One network actively establishes paths between the sources and destinations while the other, although conditioned to be able to provide such paths, remains inactive in a standby mode for establishing the paths should the active network fail. If a blocking state occurs in the active network before its maximum realizable capacity is reached, a nonblocking condition of the system is established by eliminating all of the paths in the inactive network, and then reestablishing the paths in accordance with a relatively simple algorithm that loads the network without a blocking state being reached before the network is completely full. The roles of the active and inactive networks are then reversed, so that the previously inactive network becomes active and establishes the paths between sources and destinations and the previously active network becomes inactive. The paths in the newly active network are then copied into the newly inactive network so that it will be prepared to connect the sources and destinations should the active network fail.

16 Claims, 4 Drawing Figures

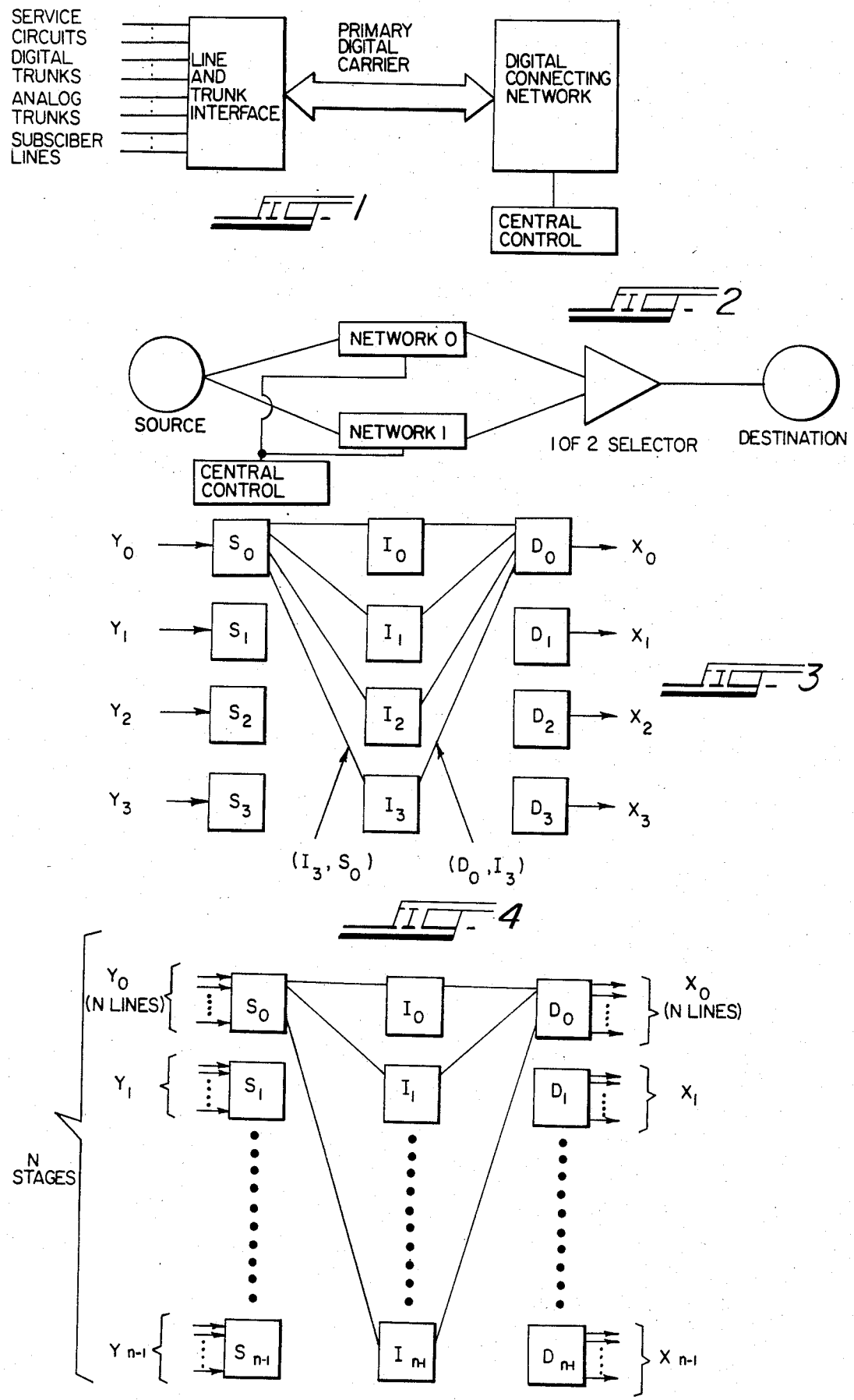

NONBLOCKING SWITCHING SYSTEM AND METHOD

BACKGROUND OF THE INVENTION

The present invention relates to switching systems for communications systems, and in particular to an improved switching system which includes a pair of three-stage connecting networks and a method of operating the same.

Many communications systems, particularly telephone systems, contain a connecting network. A connecting network is an arrangement of switches and transmission links through which terminals connected to sources and terminals connected to destinatinos may be connected together in many combinations.

Calls in progress in a connecting network do not arise in a selected order or time sequence. Requests for connections (new calls) and terminations of connections (hangups) occur more or less at random, and the performance of a network when subjected to random traffic is measured by the fraction of requested connections that cannot be completed, or by the probability of blocking.

The performance of a connecting network for a given level of traffic is determined largely by its structure, i.e., by what terminals have a switch placed between them and can be connected together by closing the switch. The structure of a network determines what combinations of terminals can be connected together simultaneously, and if the structure is too simple, only a relatively few calls can be in progress at the same time. If the structure is extensive and complex, it may accommodate a large number of simultaneous calls in progress, but the network may be expensive to build and difficult to control.

Connecting networks made of square switches have long been used in telephone central offices. In a network made of square switches, each switch has the same number of inlets as outlets. The network is said to be arranged in stages if the switches are partitioned into sets called stages, two of which respectively carry the inlets to and outlest from the network, while the other are internal stages between the two, with the arrangement being such that every path from an inlet to an outlet passes through each stage only once. If the network is full access, each switch in a given stage has a link to every switch in the adjacent stages.

A network is in a blocking state if there are an idle inlet to and outlet from the network, but no available path exists through the network to connect the inlet and outlet. A routing algorithm may be used for choosing routes through the network for unblocked calls during its operation, or in the alternative to reestablish paths through the network in a manner to prevent the network from going to a blocking state. Such a network is said to be nonblocking in the wide sense if it is capable of blocking, but there is an algorithm for assigning routes to incoming calls that precludes any blocking, such that if the rule is applied, no blocking state is accessible. The system can then satisfy demands for connections as they arise without rejecting any or rerouting existing calls. However, networks controlled by such algorithms and the algorithms themselves are often complex.

A connecting network may also be nonblocking in the strict sense, if no matter what state the network may be in, it is always possible to connect together an idle pair of terminals without disturbing calls already in progress. In most new telephone switching systems, nonblocking in the strict sense is achieved by an $N^2$ type of network. An example of this would be a 2000 port network which requires 4 million switch elements to ensure nonblocking, but such networks are quite complex and extensive and add considerable cost to the system.

OBJECTS OF THE INVENTION

An object of the present invention is to provide an improved switching system which is reduced in complexity and cost, but in which blocking states may easily be avoided.

Another object is to provide such a switching system, which comprises two connecting networks for reliability through redundancy, but by virtue of which redundancy the networks may conveniently be made nonblocking should a blocking state occur.

A further object is to provide a method of operating such a switching system.

SUMMARY OF THE INVENTION

In accordance with the present invention, there is provided a switching system for connecting individual ones of a plurality of sources to individual ones of a plurality of destinations in various combinations. The system comprises a pair of connecting networks that are nonblocking in the wide sense, each for being connected in series between all of the sources and all of the destinations. Also included are means for controlling the networks to establish and interrupt paths therethrough between individual ones of the sources and destinations, along with selector means for connecting one or the other of the networks in series between the sources and destinations, such that the network connected in series is active to establish connections between the sources and destinations, while the other network is inactive. The arrangement is such that the means for controlling, upon occurrence of a blocking state in the active network before its maximum capacity is reached and the network is full, includes means for emptying the inactive network of all paths therethrough and then establishing paths through the network which will connect the sources and destinations in the manner attempted when the active network went to a blocking state—without occurrence of a blocking state in the inactive network. After the paths are established through the inactive network, the selector means is operative to connect the inactive network in series between the sources and destinations and to disconnect the active network from in series, whereby the roles of the networks are reversed and the previously inactive network becomes active while the previously active network becomes inactive.

The invention also contemplates a method of connecting individual ones of a plurality of sources to individual ones of a plurality of destinations in various combinations. The method comprises the steps of coupling all of the sources to inlets to each of first and second connecting networks that are nonblocking in the wide sense, coupling all of the destinations to outlets from each of the networks, and connecting the first network only in series between the sources and destinations. Paths are then established and interrupted through the first network to connect and disconnect individual ones of the sources and destinations. Upon occurrence of a blocking state in the first network before it has reached its maximum capacity and is full, paths are established through the second network which will connect the sources and destinations in the manner attempted when the blocking state occurred in the first network—without causing a blocking state to occur in the second network. The second network is then connected in series between the sources and destinations and the first network is disconnected from in series, whereby the second network then connects the sources and destinations.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a block diagram of a known type of digital switching system, illustrating basic components of the system, which include a digital connecting network;

FIG. 2 is a simplified block diagram of a digital switching system according to the teachings of the present invention;

FIG. 3 is a block diagram of a 4×4 connecting network of a type which may represent each network of FIG. 2; and FIG. 4 is similar to FIG. 3, except that it illustrates a n×n connecting network.

DETAILED DESCRIPTION

The Prior Art

FIG. 1 shows in block diagram form a typical prior art digital switching system including a line and trunk interface, a digital connecting network and a central control. The line and trunk interface connects the system to the outside world, e.g., to service circuits, digital trunks, analog trunks and subscriber lines. Where the signals from the outside world are analog, the interface converts them to digital.

The digital connecting network is an arrangement of switches and transmission links through which terminals connected to sources of signals may be selectively coupled in many combinations to terminals connected to destinations, the basic function of the digital connecting network being to perform the necessary switching to establish the paths for the connections. The central control in turn provides stored program control for both the system and a man/machine interface (not shown).

Calls in progress in a digital connecting network do not usually arise in a predetermined order or time sequence. Requests for connections (new calls) and terminations of connections (hangups) occur more or less at random, and unless the network is nonblocking in the strict sense, or nonblocking in the wide sense, it can happen that the it is not able to establish a connection between a calling source and a selected destination. When that occurs, the network is said to be in a blocking state, i.e., there is an idle inlet to and an idle outlet from the network, but there is no available path through the network to connect the inlet to the outlet.

To avoid a blocking condition, most new telephone switching systems use connecting networks that are nonblocking in the strict sense. However, a strictly nonblocking network is often extensive and complex since nonblocking is normally achieved by an $N^2$ type of network, such that a 2000 port network requires 4 million switch elements to ensure nonblocking.

The Invention

To mitigate cost and complexity disadvantages of conventional switching systems having connecting networks that are nonblocking in the strict sense or nonblocking in the wide sense, as seen in FIG. 2 the invention provides an improved switching system which includes a pair of identical connecting networks 0 and 1, each of which is nonblocking in the wide sense. Every source is connected through each network to every destination, and although only a single source and destination are illustrated for simplicity, it is understood that in actual use, the networks would be connected between pluralities of sources and destinations.

At any given time, only one network actively establishes paths from sources to destinations as determined by and through a conventional 1 of 2 selector circuit. The other network is inactive at the time and in a standby mode, although the same paths established through the active network also exist in the inactive network. This type of redundant configuration of networks increases the reliability of the switching system, such that if the active network fails, the other one will be prepared to maintain the paths and assume switching functions. However, according to the invention, the redundant configuration also is used to establish an easily implementable nonblocking environment.

The connecting networks 0 and 1 are n×n three stage networks which are responsive to a central control having a man/machine interface (not shown). Connections are added and dropped in a random manner, so blocking can occur. When a blocking state occurs in the active network before it has reached its maximum capacity and is full, instead of using a complicated algorithm to rearrange existing connections in the active network, according to the invention a nonblocking condition of the system is easily reached by: (1) eliminating all of the paths in the inactive network, so that the network is empty: (2) reestablishing paths in the inactive network, according to a relatively simple algorithm, that will connect the sources to the destinations in the manner attempted when the active network reached a blocking state, without a blocking state occurring in the inactive network until the network is full; (3) switching or reversing the roles of the active and inactive networks, so that the previously inactive network becomes active and establishes the paths from the sources to the destinations through the 1 of 2 selector circuit, and the previously active network becomes inactive; and then (4) copying the paths established in the newly active network into the newly inactive network, so that the inactive network will be prepared to connect the sources to the destinations and assume switching functions should the active network fail.

To demonstrate that paths may be established through an initially empty n×n three stage network, such that no blocking state occurs until the maximum realizable capacity of the network is reached and the network is full, consider the 4×4 three stage network shown in FIG. 3, which may represent each of the networks 0 and 1. The network is comprised of square switches, each having the same number of inlets as outlets. For a 4×4 network, each stage has 4 switches and each switch has 4 inlets and 4 outlets, so inputs $Y_0-Y_3$ each represent four lines from respective sources to associated input terminals of source switches $S_0-S_3$, and outputs $X_0$–$X_3$ each represent four lines to respective destinations from associated output terminals of destination switches $D_0$–$D_3$. The network is full access, so each switch in a given stage has a transmission link to every switch in adjacent stages, although for simplicity of illustration only links between the source switch $S_0$ and intermediate stage switches $I_0$–$I_3$, as well as between the destination switch $D_0$ and the intermediate stage switches, have been shown.

Starting with an initially empty network, i.e., whichever network 0 or 1 was inactive and emptied of paths when the other became blocking, to connect the sources and destinations through the inactive network in the manner attempted when the active network reached a blocking state, such that the inactive network does not become blocking until it is completely full, a connection from $S_k$ to $D_j$ is established by choosing an intermediate stage $I_i$, through which the connection is to pass, according to the following algorithm:

Choose the path $(D_j, I_0)$, $(D_j, I_1)$, $(D_j, I_2)$ or $(D_j, I_3)$ that has the minimum number of existing connections on that particular link.

After the path is chosen and established, the path $(I_j, S_k)$ is established to complete the connection from $S_k$ to $D_j$.

The above path choosing and establishing sequence is then repeated until all of the desired connections that are to exist between sources and destinations have been established. The 1 of 2 selector circuit is then operated to reverse the roles of the active and inactive networks, such that the previously inactive network, with the newly established paths therein, becomes active and connects the sources to the destinations, and the previously active network becomes inactive. The paths in the newly active network are then copied into the newly inactive network, so that it will be prepared to assume connection and switching functions should the active network fail.

To appreciate that connections may be added to the emptied inactive network, so that no blocking occurs until the network is full, considering the following:

Note 1: The capacity of link $(D_j, I_i)$ is not exceeded since each link has a maximum capacity of $X_{max}/4$ and $X_j/4 \leq X_{max}/4$, where $X_j$ is the traffic leaving $D_j$ and $X_{max}$ is the maximum traffic capacity of $D_j$.

Note 2: Since $X_0 \leq X_{max}, \ldots, X_3 \leq X_{max}$, the maximum traffic through the center stage $I_i$ is $X_0/4 + X_1/4 + X_2/4 + X_3/4 \leq \frac{1}{4}(4X_{max}) = X_{max}$. Therefore, the maximum capacity of the center stage is not exceeded.

Note 3: Let $t_{j,k}$ = (the number of connections from $D_j$ to $S_k$) $/X_{max}$, or the portion of $X_j$ that is connected to $S_k$, and $0 \leq t_{j,k} \leq 1$. Then, the maximum traffic over link $(I_i, S_k) = \frac{1}{4}X_0 t_{0k} + \frac{1}{4}X_1 t_{1k} + \frac{1}{4}X_2 t_{2k} + \frac{1}{4}X_3 t_{3k} \leq \frac{1}{4}X_{max}(t_{0k} + t_{1k} + t_{2k} + t_{3k})$. However, for a full network $X_{max}(t_{0k} + t_{1k} + t_{2k} + t_{3k}) = X_{max}$, since the maximum traffic entering $S_k$ from the left side of the network is also $Y_{max} = X_{max}$. Therefore, for a full network $(t_{0k} + t_{1k} + t_{2k} + t_{3k}) = 1$, although in general, and to include the situation where the network is less than full, $(t_{0k} + t_{1k} + t_{2k} + t_{3k}) \leq 1$.

Thus, the maximum traffic on link $(I_i, S_k) \leq \frac{1}{4}(X_{max})$. This satisfies the maximum link requirements of link $(I_i, S_k)$.

As seen from note 1, the $(D_j, I_j)$ intermediate link capacity is not exceeded; according to note 2, the center stage capacity is not exceeded; and from note 3 it is seen that the $(I_i, S_k)$ link capacity is not exceeded. The network therefore remains nonblocking when connections are sequentially added to the initially empty network according to the above algorithm.

The proof that paths may be established through an initially empty three stage network, such that the network remains nonblocking until it is full, may be extended to any $n \times n$ network.

Consider the full access $n \times n$ network in FIG. 4, which may represent each of the networks 0 and 1. Starting with the network initially empty, to establish a connection from $S_k$ to $D_j$, choose an intermediate stage $I_i$, through which the connection is to pass, according to the following algorithm:

Choose the path $[(D_j, I_0), (D_j, I_1), \ldots, $ or $(D_j, I_{n-1})]$ that has the minimum number of existing connections on that particular link.

After the path is chosen and established, the path $(I_i, S_k)$ is established to complete the connection from $S_k$ to $D_j$.

The above path choosing and establishing sequence is then repeated until all of the desired connections that are to exist between sources and destinations have been established. The 1 of 2 selector circuit is then operated to reverse the roles of the active and inactive networks, such that the previously inactive network, with the newly established paths therein, becomes active and connects the sources to the destinations, and the previously active netowrk becomes inactive. The paths in the newly active network are then copied into the newly inactive network, so that it will be prepared to assume connection and switching functions should the active network fail.

To appreciate that connections may be added to the network, so that no blocking occurs until the network is full, consider the following:

Note 1: The capacity of link $(D_j, I_i)$ is not exceeded since each link has a maximum capacity of $X_{max}/n$ and $X_j/n \leq X_{max}/n$, where $X_j$ is the traffic leaving $D_j$ and $X_{max}$ is the maximum traffic capacity of $D_j$.

Note 2: Since $X_0 \leq X_{max}, \ldots, X_{n-1} \leq X_{max}$, the maximum traffic through the center stage $I_i$ is $X_0/n + X_1/n + \ldots + X_{n-1}/n \leq 1/n(nX_{max}) = X_{max}$. Therefore, the maximum capacity of the center stage is not exceeded.

Note 3: Let $t_{j,k}$ = (the number of connections from $D_j$ to stage $S_k)/X_{max}$, or the portion of $X_j$ that is connected to $S_k$, and $0 \leq t_{j,k} \leq 1$. Then, the maximum traffic over link $(I_i, S_k) = 1/n \; X_0 t_{0,k} + \ldots + 1/n \; X_j t_{j,k} + \ldots + 1/n \; X_{n-1} t_{n-1} \leq 1/n \; X_{max}(t_{0,k} + \ldots + t_{j,k} + \ldots + t_{n-1,k})$. However, for a full network $X_{max}(t_{0,k} + \ldots + t_{j,k} + \ldots + t_{n-1,k}) = X_{max}$, since the maximum traffic entering $S_k$ from the left side of the network is also $Y_{max} = X_{max}$. Therefore, for a full network $(t_{0,k} + \ldots + t_{j,k} + \ldots + t_{n-1,k}) = 1$, although in general, and to include the situation where the network is less than full, $(t_{0,k} + \ldots + t_{j,k} + \ldots + t_{n-1,k}) \leq 1$.

Again, the maximum traffic on link $(I_i, S_k) \leq 1/n(X_{max})$. This satisfies the maximum link requirements of link $(I_i, S_k)$.

The invention therefore contemplates a switching system having two identical, full access, $n \times n$, three stage blocking networks. One network at a given time is active and connects the sources to the destinations, while the other is inactive and in a standby mode, but has in it the same paths as are in the active network, so that should the active network fail, the inactive one will be ready to assume connections and switching functions. The redundancy provides increased reliability in the event of failure of one of the networks.

The redundancy also enables the switching system to be maintained in a nonblocking mode. Although the networks may reach a blocking state, should that occur it may readily be resolved. In particular, upon occurrence of a blocking state in the active network, the inactive network is simply cleared of the paths therein, and new paths are established that will connect the sources and destinations in the manner attempted when the active network became blocking, without a blocking state occurring in the inactive network until it is fully loaded. The roles of the active and inactive networks are then reversed.

By virtue of the arrangement, it is not necessary to interrupt and rearrange connections through the active network should it reach a blocking state, so there is no interruption of communications services. In addition, the particular algorithm for establishing the transmission paths through the inactive network is relatively simple compared with prior algorithms used to establish and rearrange paths through networks that are noblocking in the wide sense. In essence, after emptying the inactive network, paths are reestablished through its center stage, beginning with $I_0$ and sequentially cycling from $I_0$ to $I_{n-1}$, to make the connections between the center stage switches and the various output stage switches $D_0$ to $D_{n-1}$. After each path between a switch of the center stage and a switch of the output stage is established, one is then established between the particular center stage switch and a selected switch of the input stage, such that a connection from $S_k$ to $D_j$ is completed. The rule for making the connections from $S_k$ to $D_j$ ensures that the network may be completely loaded to its maximum capacity before it reaches a blocking state.

While embodiments of the invention have been described in detail, various modifications and other embodiments thereof may be devised by one skilled in the art without departing from the spirit and scope of the invention, as defined in the appended claims.

What is claimed is:

1. A switching system for connecting a plurality of sources to a plurality of destinations in various combinations, comprising a pair of connecting networks that are nonblocking in the wide sense, each for being connected in series between all of the sources and all of the destinations; means for controlling said networks to establish and interrupt paths therethrough between individual ones of the sources and destinations; and selector means for connecting one or the other of said networks in series between the sources and destinations, such that the network connected in series is active to establish connections between the sources and destinations while the other network is inactive, said means for controlling, upon occurrence of a blocking state in the active network before its maximum capacity is reached, establishing paths through the inactive network, without occurrence of a blocking state in the network until its maximum capacity is reached, which will connect the sources and destinations in the manner attempted when the active network went to a blocking state, said selector means then being operative to connect the inactive network in series between the sources and destinations and to disconnect the active network from in series, whereby the roles of said networks are reversed and the previously inactive network becomes active while the previously active network becomes inactive.

2. A switching system as in claim 1, wherein said control means is operative, after the roles of said networks are reversed, to establish in the newly inactive network paths identical to those in the newly active network, whereby the newly inactive network is prepared to connect the sources to the destinations should the newly active network fail.

3. A switching system as in claim 1, wherein said connecting networks are identical, three stage, full access, n×n networks.

4. A switching system as in claim 3, wherein each said three stage connecting network comprises an input stage having n×n switches $S_0-S_{n-1}$, a middle stage having n×n switches $I_0-I_{n-1}$ and an output stage having n×n switches $D_0-D_{n-1}$, and wherein said control means, upon occurrence of a blocking state in the active network before the network has reached its maximum capacity, is operative to interrupt any paths in the inactive network and to reestablish paths therein, to connect the sources and destinations in the manner attempted when a blocking state occurred in the active network, by establishing a connection from $S_k$ to $D_j$ by choosing an intermediate state $I_i$, through which the connection is to pass, by selecting the path $[(D_j, I_0), (D_j, I_1), \ldots$ or $(D_j, I_{n-1})]$, according to which middle stage has the minimum number of connections to output stages, and to then establish a path from $I_i$ to $S_k$ to complete the connection from $S_k$ to $D_j$, said control means then being operative to repeat the establishment of additional paths from $S_k$ to $D_j$ until all of the connections between sources and destinations have been made.

5. A switching system for connecting a plurality of sources to a plurality of destinations in various combinations, comprising first and second connecting networks, each of which is nonblocking in the wide sense and has a plurality of inlets for connection with individual ones of all of the sources, a plurality of outlets for connection with individual ones of all of the destinations, and switch means in circuit between said inlets and outlets and operable to establish and interrupt transmission paths between said inlets and outlets; selector means for selectively connecting either said first or second network in series between the sources and destinations, such that whichever network is in series is active to establish connections between the sources and destinations while the other network is inactive; and control means for operating said switch means of said networks to establish and interrupt transmission paths through the same to connect, through the active network, individual ones of the sources and destinations in a selected manner and, upon occurrence of a blocking state in the active network before its maximum capacity is reached, for operating said switch means of the inactive network to establish transmission paths therethrough, without occurrence of a blocking state in the network until its maximum capacity is reached, which will connect the sources and destinations in the manner attempted when the blocking state occurred in the active network, said selector means then being operative to connect the inactive network in series between the sources and destinations and to disconnect the active network from in series, whereby the roles of said networks are reversed and the previously inactive network becomes active while the previously active network becomes inactive.

6. A switching system as in claim 5, wherein said control means is operative, after the roles of said networks are reversed, to establish in the newly inactive network paths identical to those in the newly active network, whereby the newly inactive network is prepared to connect the sources to the destinations should the newly active network fail.

7. A switching system as in claim 5, wherein said connecting networks are identical, three stage, full access, $n \times n$ networks.

8. A switching system as in claim 7, wherein each said three stage connecting network comprises an input stage having $n \times n$ switches $S_0$–$S_{n-1}$, a middle stage having $n \times n$ switches $I_0$–$I_{n-1}$, and an output stage having $n \times n$ switches $D_0$–$D_{n-1}$, and wherein said control means, upon occurrence of a blocking stage in the active network before the network has reached its maximum capacity, is operative to interrupt any paths in the inactive network and to reestablish paths therein, to connect the sources and destinations in the manner attempted when a blocking state occurred in the active network, by establishing a connection from $S_k$ to $D_j$ by choosing an intermediate stage $I_i$, through which the connection is to pass, by selecting the path $[(D_j, I_0), (D_j, I_1), \ldots$ or $(D_j, I_{n-1})]$, according to which middle stage has the minimum number of connections to output stages, and to then establish a path from $I_i$ to $S_k$ to complete the connection from $S_k$ to $D_j$, said control means then being operative to repeat the establishment of paths from $S_k$ to $D_j$ until all of the connections between sources and destinations have been made.

9. A method of connecting individual ones of a plurality of sources to individual ones of a plurality of destinations in various combinations, comprising the steps of coupling all of the sources to inlets to each of first and second connecting networks that are nonblocking in the wide sense; coupling all of the destinations to outlets from each of the networks; connecting the first network only in series between the sources and destinations; establishing and interrupting paths through the first network to connect and disconnect individual ones of the sources and destinations; and, upon occurrence of a blocking state in the first network before it has reached its maximum capacity, establishing paths through the second network, without a blocking state occurring in the network until its maximum capacity is reached, which will connect the sources and destinations in the manner attempted when the blocking state occurred in the first network, and then connecting the second network in series between the sources and destinations and disconnecting the first network from in series, whereby the second network then connects the sources and destinations, said establishing and interrupting step then establishing and interrupting paths through the second network.

10. A method as in claim 9, wherein said establishing and interrupting step simultaneously establishes and interrupts the same paths through the second network as through the first, and including the steps, upon failure of the first network, of disconnecting the first network from, and placing the second network in, series between the sources and destinations.

11. A method as in claim 10, including the step, upon occurrence of a blocking state in the first network, and prior to establishing through the second network the paths attempted to be established through the first network at the time it reached a blocking state, of interrupting all paths through the second network so that the network is empty.

12. A method as in claim 9, including the step, after disconnecting the first network from in series between the sources and destinations, of establishing in the first network the same paths as are in the second network, so that should the second network fail, the first network is prepared to be connected in series between the sources and destinations.

13. A method as in claim 9, wherein the first and second networks are identical, three stage, full access $n \times n$ networks, each of which has an input stage having $n \times n$ switches $S_0$–$S_{n-1}$, a middle stage having $n \times n$ switches $I_0$–$I_{n-1}$ and an output stage having $n \times n$ switches $D_0$–$D_{n-1}$, and wherein said step of establishing paths through the second network comprises the steps of interrupting any paths through the network, and then reestablishing paths by establishing a connection from $S_k$ to $D_j$ by choosing an intermediate stage $I_i$, through which the connection is to pass, by selecting the path $[(D_j, I_0), (D_j, I_1), \ldots$ or $(D_j, I_{n-1})]$, according to which middle stage has the minimum number of connections to output stages, establishing a path from $I_i$ to $S_k$ to complete the connection from $S_k$ to $D_j$, and then repeating said steps to establish a connection from $S_k$ to $D_j$ until all of the connections between sources and destinations have been made.

14. A method of operating a switching system for connecting individual ones of a plurality of sources to individual ones of a plurality of destinations through one or the other of first and second connecting networks that are nonblocking in the wide sense, comprising the steps of controlling paths through the first network to establish connections between the sources and destinations through the first network only; and, upon occurrence of a blocking state in the first network before its maximum capacity is reached, establishing paths through the second network, without a blocking state occurring in the network until its maximum capacity is reached, that will connect the sources and destinations in the manner attempted when the blocking state occurred in the first network, and then establishing connections between the sources and destinations through the second network only.

15. A method as in claim 14, including the step, while the first network is establishing connections between the sources and destinations, of establishing through the second network paths that will connect sources and destinations in the same manner as they are being connected by the first network, and also including the steps, should the first network fail, of interrupting the connections between sources and destinations through the first network and establishing the connections through the second network.

16. A method as in claim 14, including the step, after establishing connections between the sources and destinations through the second network, of establishing through the first network paths that will connect sources and destinations in the same manner as they are being connected by the second network, and also including the steps, should the second network fail, of interrupting the connections between sources and destinations through the second network and establishing the connections through the first network.

* * * * *